(12) United States Patent
Piveteau et al.

(10) Patent No.: US 11,250,107 B2
(45) Date of Patent: Feb. 15, 2022

(54) METHOD FOR INTERFACING WITH HARDWARE ACCELERATORS

(71) Applicant: International Business Machines Corporation, Armonk, NY (US)

(72) Inventors: Christophe Piveteau, Zurich (CH); Nikolas Ioannou, Zurich (CH); Igor Krawczuk, Renens (CH); Manuel Le Gallo-Bourdeau, Zurich (CH); Abu Sebastian, Adliswil (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 16/511,689

(22) Filed: Jul. 15, 2019

(65) Prior Publication Data

US 2021/0019362 A1 Jan. 21, 2021

(51) Int. Cl.
*G06F 17/16* (2006.01)
*G06F 9/30* (2018.01)
*G06F 9/48* (2006.01)
*G06N 3/06* (2006.01)

(52) U.S. Cl.
CPC .......... *G06F 17/16* (2013.01); *G06F 9/30003* (2013.01); *G06F 9/4881* (2013.01); *G06N 3/06* (2013.01)

(58) Field of Classification Search
None
See application file for complete search history.

(56) References Cited

U.S. PATENT DOCUMENTS

| | | | |
|---|---|---|---|
| 9,411,853 B1 | 8/2016 | Dovrtel et al. | |
| 9,529,590 B2 | 12/2016 | Song | |
| 2009/0217275 A1 | 8/2009 | Krishnamurthy et al. | |
| 2010/0058031 A1* | 3/2010 | Aho | G06F 9/544 712/42 |
| 2016/0379115 A1 | 12/2016 | Burger et al. | |
| 2018/0075338 A1 | 3/2018 | Gokmen | |
| 2019/0042237 A1* | 2/2019 | Azizi | G06F 9/3001 |

OTHER PUBLICATIONS

Nandakumar, S.R., et al., "Mixed-precision architecture based on computational memory fortraining deep neural networks", IEEE 2018, 5 pages.
International Search Report, PCT/EP2020/068377, dated Sep. 29, 2020, 12 pages.

* cited by examiner

*Primary Examiner* — Craig C Dorais
(74) *Attorney, Agent, or Firm* — Harrington & Smith (57) ABSTRACT

The present disclosure relates to a method for executing a computation task composed of at least one set of operations where subsets of pipelineable operations of the set of operations are determined in accordance with a pipelining scheme. A single routine may be created for enabling execution of the determined subsets of operations by a hardware accelerator. The routine has, as arguments, a value indicative of input data and values of configuration parameters of the computation task, where a call of the routine causes a scheduling of the subsets of operations on the hardware accelerator in accordance with the values of the configuration parameters. Upon receiving input data of the computation task, the routine may be called to cause the hardware accelerator to perform by the computation task in accordance with the scheduling.

19 Claims, 7 Drawing Sheets

METHOD FOR INTERFACING WITH HARDWARE ACCELERATORS

BACKGROUND

The present invention relates to the field of digital computer systems, and more specifically, to for executing a computation task composed of a set of operations.

Hardware acceleration enables the use of computer hardware specially made to perform some functions more efficiently than is possible in software running on a general-purpose CPU. For example, an operation can be computed in application-specific hardware designed to compute the operation faster than on a general-purpose computer processor. However, there is a need to improve computation of multitude of those operations.

SUMMARY

Various embodiments provide a method for executing a computation task composed of a set of operations, computer system and computer program product as described by the subject matter of the independent claims. Advantageous embodiments are described in the dependent claims. Embodiments of the present invention can be freely combined with each other if they are not mutually exclusive.

In one aspect, embodiments of the invention relate to a computer implemented method for executing a computation task composed of at least one set of operations. The method comprises
determining subsets of pipelineable operations of the set of operations in accordance with a pipelining scheme;
creating a single routine for enabling execution of the determined subsets of operations by a hardware accelerator, the routine having as arguments a value indicative of input data and values of configuration parameters of the computation task, wherein a call of the routine causes a scheduling of the subsets of operations on the hardware accelerator in accordance with the values of the configuration parameters;
upon receiving input data of the computation task calling the routine, thereby causing the hardware accelerator to perform the computation task in accordance with the scheduling.

In another aspect, embodiments of the invention relate to a computer system being configured for:
determining subsets of pipelineable operations of at least one set of operations of a computation task in accordance with a pipelining scheme;
creating a single routine for enabling execution of the determined subsets of operations by a hardware accelerator, the routine having as arguments a value indicative of input data and values of configuration parameters of the computation task, wherein a call of the routine causes a scheduling of the subsets of operations on the hardware accelerator in accordance with the values of the configuration parameters;
upon receiving input data of the computation task calling the routine, thereby causing the hardware accelerator to perform the computation task in accordance with the scheduling.

In another aspect, embodiments of the invention relate to a computer program product comprising a computer-readable storage medium having computer-readable program code embodied therewith. The computer-readable program code is configured for:
determining subsets of pipelineable operations of at least one set of operations of a computation task in accordance with a pipelining scheme;
creating a single routine for enabling execution of the determined set of operations by a hardware accelerator, the routine having as arguments a value indicative of input data and values of configuration parameters of the computation task, wherein a call of the routine causes a scheduling of the subsets of operations on the hardware accelerator in accordance with the values of the configuration parameters;
upon receiving input data of the computation task calling the routine, thereby causing the hardware accelerator to perform the computation task in accordance with the scheduling.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may speed up the computations performed by the hardware accelerators by using as much as possible units of the hardware accelerator in parallel. By contrast to a serial execution of operations, the present subject matter can make use of pipelining, as it gives the hardware accelerator not only information about a small part of the task to be performed but information on the whole task.

In case the computation task is a training of a deep neural network (DNN), the present subject matter gives the hardware accelerator not only information about a small part of the network but information of the full network that is needed for pipelining. Instead of sending commands for individual network operations (e.g. matrix multiplication, convolution, activation, etc. . . . ) one-by-one to the hardware accelerator, the present subject matter may enable to group them into one or more composite operations. The hardware accelerator can then take these composite operations and execute them in accordance with a predefined and optimized pipeline. For example, due to the non-Von Neumann nature of computational memory, the computational resources located on different crossbar arrays may be reused in the form of pipelining. The speedup gained by composite operations and pipelining might particularly be advantageous for linear algebra applications.

The present subject matter may provide a software interface for interfacing with the hardware accelerator. The software interface may comprise functions that enable access to hardware functions of the hardware accelerator. The single routine may be a function of these functions of the software interface. When a calling program invokes the single routine, commands may be issued to the hardware accelerator in order to perform the computation task. Commands to the hardware accelerator may be passed as composite operations which represent a sequence of fundamental operations supported by the hardware accelerator. A composite operation may for example be a forward propagation and/or backward propagation of the training. Once the hardware accelerator sends data back to the software interface, the software interface may provide the data to the original calling program. A pipelining scheme (or execution pipeline) may be defined for at least part of the composite operations e.g. for each composite operation a pipelining scheme may be defined. This may allow an optimal use of the computational capabilities of the hardware accelerator.

According to one embodiment, the computation task comprises any one of a: training a deep neural network (DNN), matrix vector multiplication and matrix matrix multiplication.

This embodiment may particularly be advantageous for matrix-vector multiplication with large dense matrices. For example, due to physical limitations, crossbar arrays of the hardware accelerators may only reach a certain size of matrices to be processed. For that, the multiplication of large matrices may be split up. This embodiment may enable the user to pass the complete matrix-vector multiplication as a composite operation. The matrix may be decomposed into suitable slices and distributed across different crossbar arrays of the hardware accelerator. The individual matrix-vector multiplications can then be performed in parallel. For example, a matrix that doesn't fit on a single crossbar may be denoted by $$M = \begin{pmatrix} A & B \\ C & D \end{pmatrix}.$$

The matrix M is to be multiplied by vector $$\begin{pmatrix} x \\ y \end{pmatrix}.$$

This embodiment may enable to perform that multiplication using the following instructions:
making a single API call of the routine,
splitting up, by a computational memory software stack, M into A, B, C and D,
computing A*x, B*y, C*x and D*y in parallel, and
adding up the results of the computations by the computational memory software stack.

This is by contrast to another multiplication technique that has the following instructions:
splitting up M into A, B, C and D e.g. by a user,
performing 4 API calls to compute A*x, B*y, C*x and D*y separately, and
adding up the matrices accordingly by the user.

According to one embodiment, the at least one set of operations comprises a first set of operations for forward propagation, and/or a second set of operations for backward propagation and/or a third set of operations for both forward and backward propagation of the training. The method comprises: generating for each of the first, second and third sets of operations a respective composite operation, wherein calling the routine comprises performing a single application programming interface (API) call for each composite operation of at least part of the generated composition operations. The composite operation may be generated or defined so that a single API call may be sufficient to trigger and perform the whole operations from which the composite operation is generated. The composite operation may be generated so that it is configured to receive a single input and to provide as an output the result of performing the computation task (or the result of the set of operations). This may enable that the single routine has as arguments a value indicative of input data and values of configuration parameters of the computation task. By a single calling of the routine an output indicative of the desired result may be obtained.

According to one embodiment, the configuration parameters comprise parameters descriptive of the structure of the deep neural network and parameters required for configuring the training of the deep neural network.

According to one embodiment, the method further comprises providing an application programming interface, API, to the hardware accelerator, and creating the routine using the API. The hardware accelerator may for example be an artificial intelligence based hardware accelerator.

According to one embodiment, the method further comprises providing a computation graph descriptive of the computation task, the computation task involving a deep neural network, determining the at least one set of operations by parsing the computation graph for identifying the at least one set of operations using nodes of the computation graph, generating a user graph such that each set of the at least one set of operations is represented by a node of the user graph, wherein calling the routine comprises identifying each node of the user graph that represents a respective set of operations, and for each identified node performing a single API call for the set of operation represented by the identified node.

For some applications, a program/sequence of operations is represented as a computation graph (dataflow graph), wherein nodes represent units of computation. This embodiment may enable to translate such a computation graph into a flow that makes a full usage of the computational memory hardware (e.g. by generating a new representation which uses composite operations). For that, a graph parser may be used to group pipelineable operations in the graph into composite operations. The graph parser may receive as input the computation graph and may output a transformed graph with suitable operation sequences consolidated into composite operations. Using such a graph parser, programs written in already-established deep learning frameworks can be directly used with computational memory deep learning accelerators.

According to one embodiment, the method further comprises receiving an output from the hardware accelerator indicative of the result of the computation task.

According to one embodiment, the pipelining scheme is provided such that each of the subsets of operations comprises operations independent from each other that can be executed in parallel.

According to one embodiment, the hardware accelerator operates in accordance with the pipelining scheme using memristor crossbar arrays. The subsets of pipelineable operations are determined such that each subset of operations of the subsets may be performed in parallel on different crossbar arrays of the memristor crossbar arrays. Analog memory crossbar arrays offer inexpensive vector-matrix computation engines with O(1) computational complexity, promising significant acceleration for neural networks and linear algebra applications.

According to one embodiment, the hardware accelerator operates in accordance with the pipelining scheme using memristor crossbar arrays, the computation task comprising training a deep neural network, wherein each layer of the deep neural network is associated with two crossbar arrays of the hardware accelerator, the two crossbar arrays comprising identical values, wherein causing the hardware accelerator to perform the computation task comprises: for each layer of the deep neural network using one crossbar array of the two crossbar arrays for forward propagation and the other crossbar array only for the backward propagation.

Figure 1:
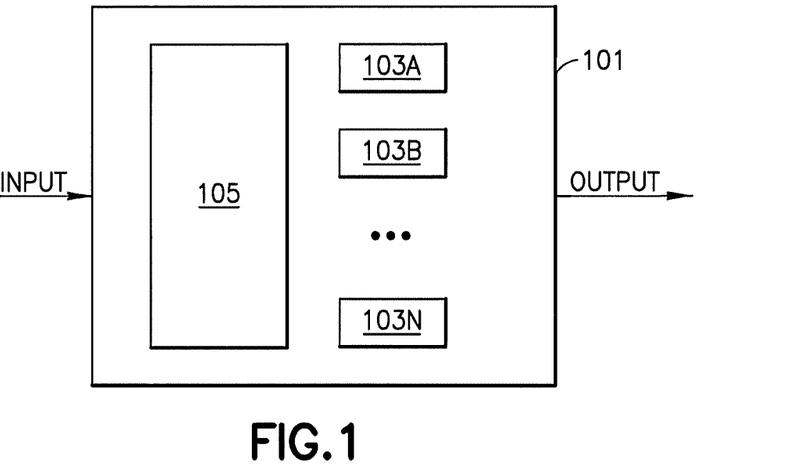
FIG. 1 depicts an example structure of a hardware accelerator.

FIG. 1 depicts an example structure of a hardware accelerator. The hardware accelerator 100 may for example be an analog and/or digital based accelerator.

The hardware accelerator 100 may be configured to perform a computation task such as training a neural network, running inference with a trained neural network, image processing, summing integer numbers etc.

As with most of the tasks, the computation task may be break down into a set of operations. For example, in case of summing numbers, the task may be break down into prefix sum operations that enable to obtain the sum of the integers in an optimal way. In case of machine learning, most of the computation tasks are a combination of one or more vector-matrix-multiplications and activation functions. For example, deep neural networks involve a vector-matrix-multiplication, in which a vector of neuron excitations, $x_i$, is to be multiplied by a matrix of weights, $w_{ij}$, generating a new vector of neuron excitations for the next layer, $y_j$. This breaks down the computation task into a multiply-accumulate operations ($\Sigma w_{ij} x_i$), followed by a nonlinear squashing function.

Thus, depending on the computation task, different architectures of the hardware accelerator 100 can be designed to implement the operations of the task. In other terms, the skilled person in the art, having a given computation task, can provide an architecture of the hardware accelerator that enables at least part of the computation task. In the following, the hardware accelerator 100 is described with reference to an artificial intelligence application but it is not limited to.

The hardware accelerator 100 comprises an integrated circuit 101. The integrated circuit 101 is configured to perform operations on analog and/or digital signals. The integrated circuit 101 comprises a plurality of physically implemented functional units 103A-N. The functional units 103A-N are provided such that the conventional instruction fetch and decode steps of an instruction cycle are not needed for performing the computation task. For example, the functional units 103A-n may form a hierarchy of chips comprising memristor arrays, ADCs at the periphery of the arrays, embedded DRAM (eDRAM) for buffering intermediate terms and digitized array outputs e.g. for enabling multiply-accumulate operations involved in a forward inference of a DNN.

The function of the hardware accelerator 100 is dependent on the functional units 103A-N being chosen for the hardware accelerator 100. For example, parameters like the size of the memristor crossbar array, the number of crossbars, the number of ADCs etc. may be used in order to define an algorithm according to which the hardware accelerator 100 can perform the computation task. For example, the algorithm may make use of parallel calculations and a pipelining scheme to reduce the number of steps of the computation task and thus may reduce the time complexity compared to another algorithm that performs a sequential execution of the calculations.

Thus, depending on the algorithm being used to operate the hardware accelerator 100, the functional units 103A-N may be configured to receive and provide data between each other in accordance with the algorithm. For that, the hardware accelerator 100 may comprise a component 105 that controls and sequences events in time. The component 105 may comprise one or more finite state machines. The finite state machines may be driven by loading control vectors into the hardware accelerator 100 e.g. the mapping of functional units 103A-N and the pipelining scheme may be determined off-line and loaded into control registers that drive the finite state machines.

Figure 2A:
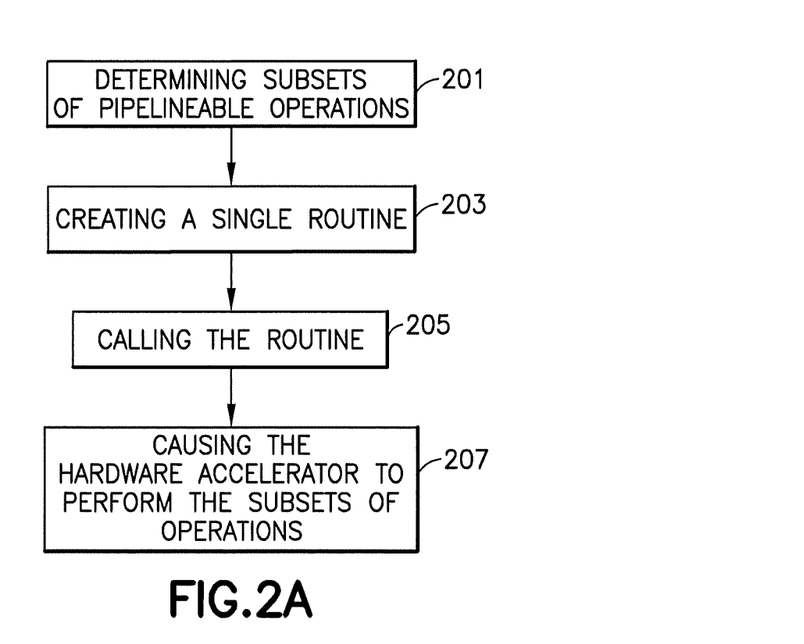
FIG. 2A is a flowchart of a method for executing a computation task composed of a set of operations, using a hardware accelerator, in accordance with an example of the present subject matter.

FIG. 2A is a flowchart of a method for executing a computation task composed of a set of operations, using a hardware accelerator e.g. 100, in accordance with an example of the present subject matter.

For simplification purpose, the method of FIG. 2A is described with reference to the computation task being a matrix-matrix multiplication but it is not limited to. In case of matrix-matrix multiplication, the multiplication can be decomposed into a sequence of matrix-vector multiplications, wherein the set of operations are the matrix-vector multiplications.

In order to make an optimal or maximal use of the hardware accelerator 100, a pipelining scheme may be used. The pipelining scheme may define a pipeline which is divided in stages, wherein each stage completes a part of the computation task in parallel and the stages are related one to the next to form a pipeline. The pipelining scheme may be determined based on the structure and functions of the functional units and the computation task e.g. the determination of the pipelining scheme may take into account the knowledge about the hardware capabilities of the hardware accelerator such as the number of memristive crossbar operations that can be computed in parallel.

Figure 2B:
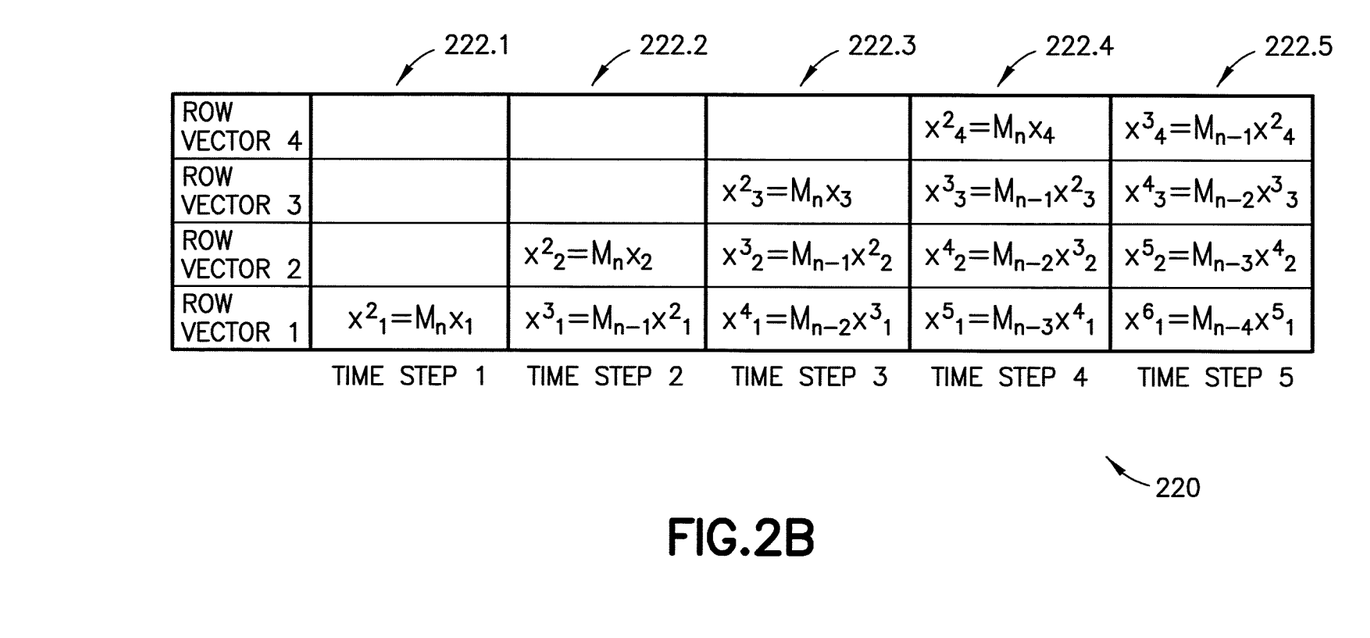
FIG. 2B illustrates a pipelining scheme for matrix-matrix multiplication.

Following the matrix-matrix multiplication example, the computation task may be a chain of matrix multiplications $M_1 \times M_2 \ldots \times M_5$ to be performed. For example, each matrix of the matrices may be a 4×4 matrix. In order to perform this chain of matrix multiplications in an optimal way, the following method or flow may be used: each matrix of the matrices $M_1 \times M_2 \ldots \times M_4$ may be stored in a respective crossbar array, the last matrix $M_5$ may be decomposed into column vectors and the vectors may be fed into the crossbar arrays as illustrated in FIG. 2B. Based on this flow, a pipelining scheme may be defined for optimally executing the multiplications $M_1 \times M_2 \ldots \times M_5$ as shown in table 220 of FIG. 2B, wherein 5 stages (or time steps) 222.1-5 are defined and in each stage one or more matrix vector multiplications may be performed. As shown in FIG. 2B, in the first stage 222.1 only one initial first matrix vector multiplication may be performed $x^2_1 = M_n x_1$ using the crossbar array that stores matrix $M_n$ e.g. the crossbar array is fed with the 4 elements of vector $x_1$. This first stage 222.1 may provide $x^2_1$ as output (result of the multiplication) to the second stage 222.2. In the second stage 222.2, the second matrix vector multiplication may be performed $x^2_2=M_n x_2$ by the crossbar array that stores matrix $M_n$ since that crossbar array becomes free after completing the first stage. In parallel to the second multiplication, a third multiplication may be performed namely $x^3_1=M_{n-1}x^2_1$. Since the third multiplication requires the result of the first multiplication, it is only executed in the second stage 222.2 after the execution of the first multiplication is performed. In the last two stages 222.4-5, all crossbar arrays are running in parallel respective multiplications, enabling a full usage of the hardware accelerator.

Thus, based on the pipelining scheme, subsets of pipelineable operations may be determined in step 201 from the set of operations in accordance with the pipelining scheme. The subset of pipelineable operations may for example comprise operations that can be performed in parallel e.g. in a given stage of the pipeline. The determined subsets of operations may allow the full or optimal utilization of the hardware accelerator 100. Following the example of FIG. 2B, a first subset of operations may comprise operation $x^2_1=M_n x_1$, a second subset of operations may comprise two operations $x^2_2=M_n x_2$ and $x^3_1=M_{n-1}x^2_1$, a third subset of operations may comprise three operations $x^2_3=M_n x_3$, $x^3_2=M_{n-1}x^2_2$ and $x^4_1=M_{n-2}x^3_1$ and so on.

Having defined a pipeline of operations to be performed e.g. as shown in FIG. 2B, the present method may be advantageous as it may need a single routine only for enabling execution of the whole computation task. The single routine may be created in step 203, so that the arguments of the routine may indicate to the hardware accelerator data that enables the execution of the pipeline e.g. without requiring further inputs from the routine. For example, the arguments may comprise a value indicative of input data and values of configuration parameters of the computation task. In one example, an API may be provided so as to interface with the hardware accelerator 100, wherein the single routine may be a function of the API. In this case, the call of the single routine may be referred to as an API call. In another example, the single routine may be defined using functions of the API.

The call of the routine causes a scheduling of the subsets of operations on the hardware accelerator 100 in accordance with the values of the configuration parameters. For example, the values of the configuration parameters may be loaded as control vectors into the hardware accelerator 100 to drive the finite state machines that steer inputs and outputs correctly after every cycle/stage.

For example the call of the routine may be performed as follows: 1) make single API call referencing all 5 matrices; 2) the software stack maps $M_1$ $M_2$ $M_3$ and $M_4$ onto crossbar arrays and 3) row vectors of X are passed through crossbars in pipelined fashion. This is by contrast to a method that makes at least 5 API calls to compute individual matrix-matrix multiplications.

Steps 201 and 203 may, for example, be performed offline e.g. before using the hardware accelerator 100 for computation.

Upon receiving input data of the computation task, the routine may be called in step 205 such that the hardware accelerator 100 may perform the computation task in step 207 in accordance with the scheduling. The results of the computation task may be received from the hardware accelerator 100. Following the above example, the hardware accelerator may comprise 4 crossbar arrays that store the elements of the matrices $M_1$ to $M_4$ respectively. The arguments of the routine in this case may comprise the vectors x1 to x4 of the matrix $M_5$ as input data and as configuration parameters indicative of matrices M1, M2, M3 and M4. For example, instead of performing the following four calls mm1=MatMul(M4, M5); mm2=MatMul(M3, mm1); mm3=MatMul(M2, mm2); and output=MatMul(M1, mm3), a single call (e.g. API call) may be performed as follows output=Composite(config, M5) where the configuration parameters may be defined as config=MatrixMatrixMultiplicationChain(M1,M2,M3,M4).

Figure 3A:
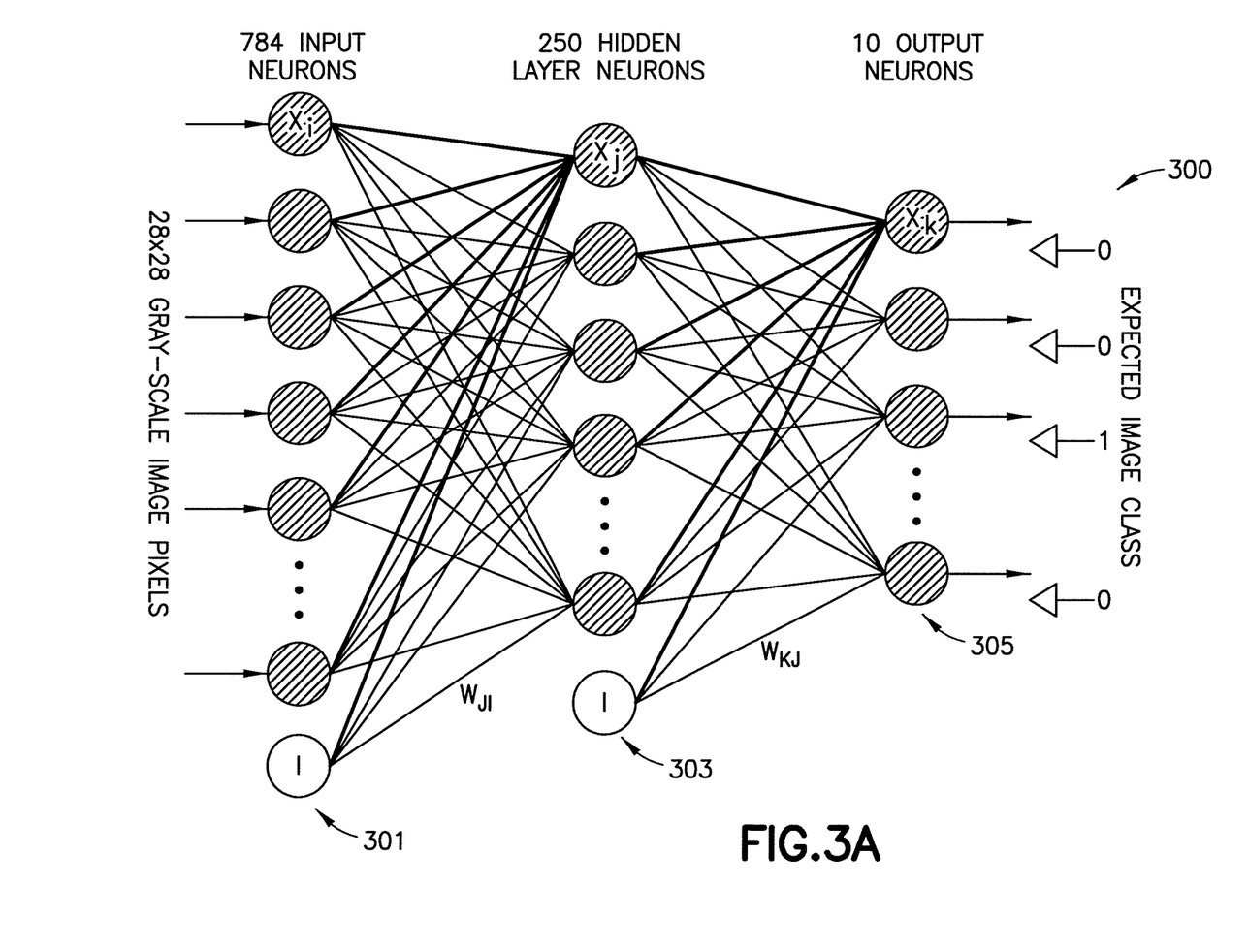
FIG. 3A illustrates an example hardware accelerator for training a deep neural network.

FIG. 3A illustrates an example hardware accelerator 300 for training a DNN having an input layer 301, one hidden layer 303 and an output layer 305. In this case, the set of operations may comprise operations for forward propagation and/or operations for backward propagation of the training.

The three layers have 784, 250, 10 neuromorphic neuron apparatuses respectively. The output layer has 10 neuromorphic neuron apparatuses representing the 10 possible digits 0 to 9, and the input layer has 784 neuromorphic neuron apparatuses representing the number of pixels of an input MNIST image. Each of the neuron apparatuses may be configured to use an activation function for generating an output value based on a current state (e.g. defined by $x_i$) of the neuron apparatus. The hardware accelerator 300 may further comprise two crossbar arrays or memristive crossbar arrays (not shown) for computing the multiplication of the weight elements $W_{JI}$ and $W_{KJ}$ respectively with activation vectors x. For example, the matrix-vector multiplication of a matrix W having elements $W_{JI}$ with activation vector x of the input layer may be realized through a first memristive crossbar array by representing each matrix element with the conductance of the corresponding memristor element of the first memristive crossbar array, wherein the multiplication of the matrix W and vector x may be performed by inputting voltages representing the vector values x to the first memristive crossbar array and the resulting currents are indicative of the product of W and x. A resistive memory element (or device) of the crossbar array may for example be one of a phase change memory (PCM), metal-oxide resistive RAM, conductive bridge RAM and magnetic RAM. In this example of FIG. 3A, the functional units may comprise at least the two crossbar arrays and the neuromorphic neuron apparatuses.

Knowing the computation task which is the training of a 3 layer DNN and having access to the way the functional units of the hardware accelerator 300 operate, a pipelining scheme may be defined with a given number of stages (cf. FIG. 3C), wherein in each stage one or more operations may be performed in parallel by functional units of the hardware accelerator 300.

Figure 3B:
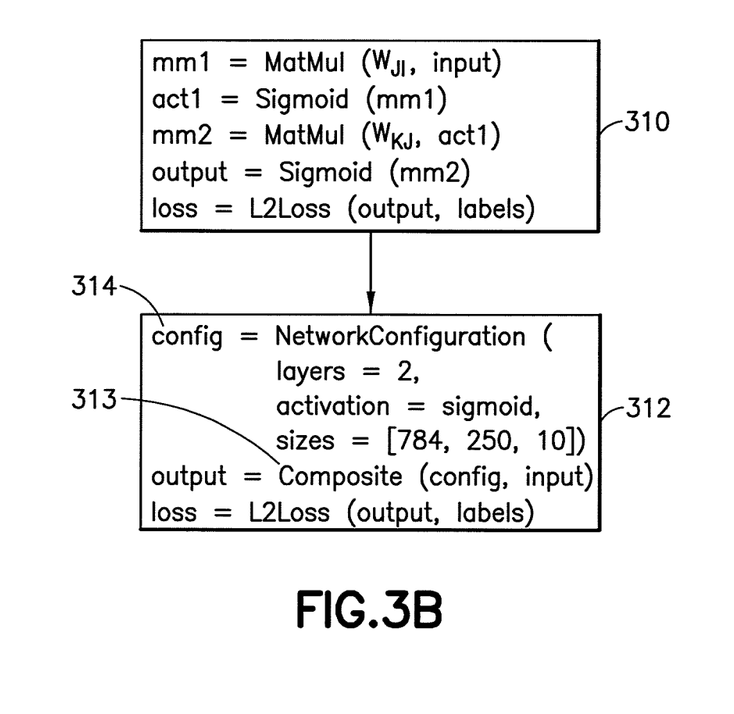
FIG. 3B depicts example codes.

Instead of having one API call for each layer operation (e.g. matrix multiplication, convolution, activation, pooling, etc. . . . ) as shown with code 310 of FIG. 3B, a single API call 313 may be used as shown with code 312 of FIG. 3B. The input of the API call 313 may be MNIST images and the configuration parameters 314 that are descriptive of the DNN as indicated by the code 312. By executing the code 312 multiple operations may be chained and executed together.

Figure 3C:
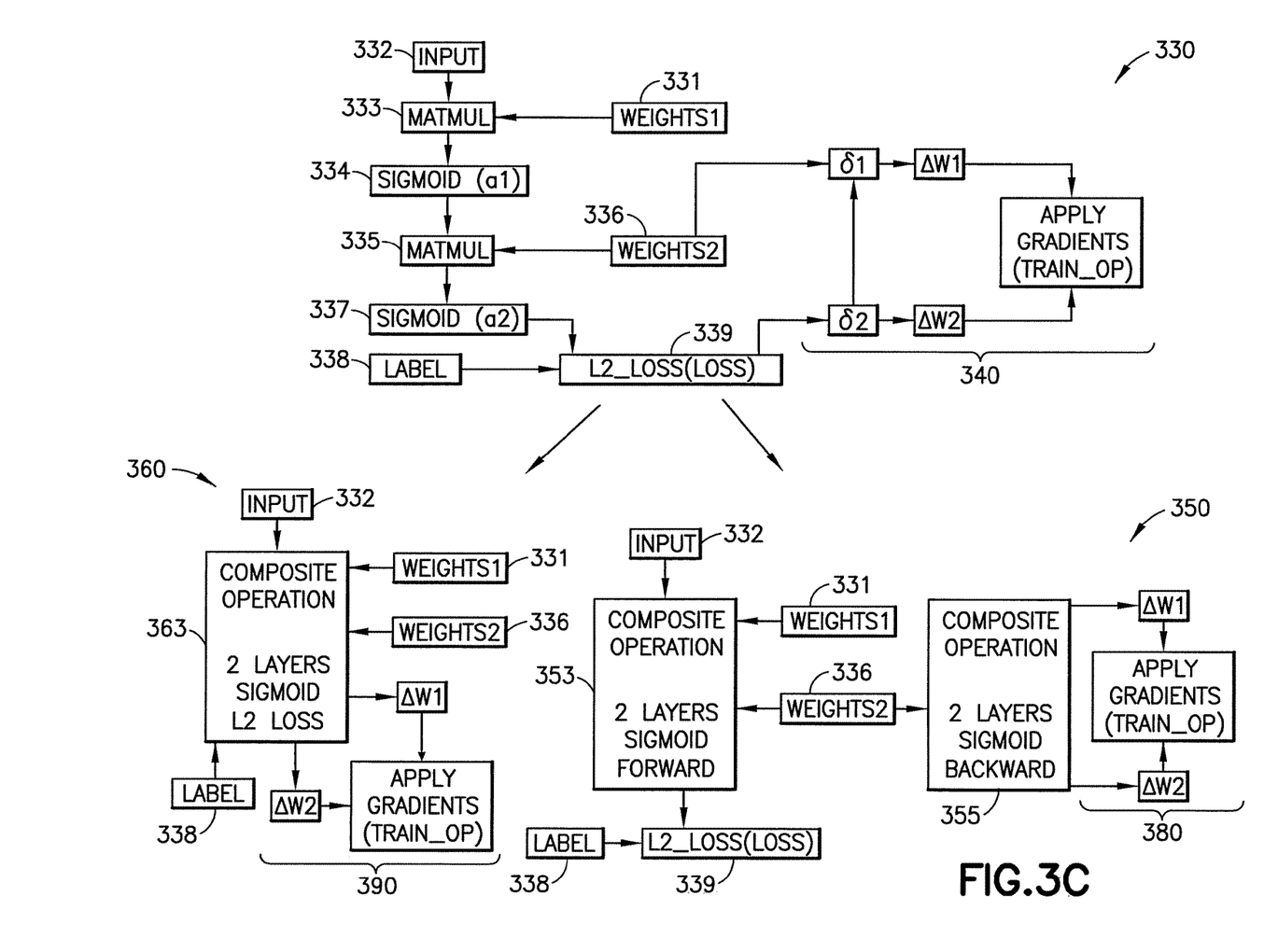
FIG. 3C depicts diagrams of a flow for the task of training a deep neural network.

FIG. 3C depicts a first diagram 330 illustrating an execution scheme or algorithm for the training of the DNN of FIG. 3A and a second diagram 350 illustrating an execution scheme for the training of the DNN of FIG. 3A in accordance with an example of the present subject matter and a third diagram 360 illustrating an execution scheme of the training of the DNN of FIG. 3A in accordance with another example of the present subject matter.

The training of the DNN may for example require inputting multiple sets of images, and for each set of images the forward propagation may be performed without changing the synaptic weights so that the prediction error of the DNN, to be back propagated, may be estimated by combining the errors obtained for the set of images (instead of only one image).

The first diagram 330 is a computation graph that indicates the flow of the computation task. For example, the weights 331 and an input vector 332 of a first set of inputs may be multiplied in response to a first API call of the matmul function 333. The result of the first API call is used to perform a second API call of the Sigmoid function 334. The result of the second API call is used to perform a third API call of the matmul function 335 involving the multiplication of the weights 336 and the vector resulting of the second AP call. The result of the third API call is used to perform a fourth API call of the Sigmoid function 337. The vector resulting from the fourth API call and a label 338 of the input 332 may be used to compute a loss function 339. The difference between the vector resulting from the fourth API call and the label 338 may be used to compute prediction errors δ performed by the DNN. The computed prediction errors δ may be back propagated. And the weights 331 and 336 may be updated after the back propagation using the delta of all weights ΔW as indicated by the diagram 340. Those API calls may be repeated for each additional input 332 until the computation task is performed e.g. the computation task may require 100 input images for forward propagation. The second set of inputs enters the first diagram after completing the last API call of the first set of inputs. Thus, while processing the first set (or second set of inputs) the computation task that is performed following the flow of the first diagram 300 may not benefit from the fact that the weights 336 and 331 do not change for each set of inputs e.g. each of the crossbars that store the weights 336 and 331 are not used for parallel computation.

To make use of parallel computations, the flow described by the second diagram 350 may be used. The second diagram 350 is a computation graph that indicates the flow of the computation task in accordance with an example of the present subject matter. For enabling the flow of the second diagram 350, two pipelining schemes may be defined, one for forward propagation and the other for backward propagation of the training. In this case, the set of inputs 332 is provided in combination with both weights 331 and 336 as input to a composite operation 353 that can be invoked by a single routine for performing the forward propagation. The composite operation 353 may process the inputs in accordance with a pipelining scheme e.g. if the set of inputs comprises two images, during a first stage only the first image is processed by the first crossbar array while during a second stage/cycle of the pipeline the first image is processed by the second crossbar that stores the weights 336 and in parallel the second image is processed using the first crossbar array that stores the weights 331. The loss function 339 is used as described above to estimate prediction errors. The prediction errors may be back propagated using matrix-vector multiplications. This is indicated by another composite operation 355. The composite operation 355 may process the inputs for backward propagation of the prediction errors in accordance with a pipelining scheme in a similar way as described with the forward propagation. And, the weights 331 and 336 may be updated using the delta of all weights ΔW as indicated by the diagram 380.

Figure 4:
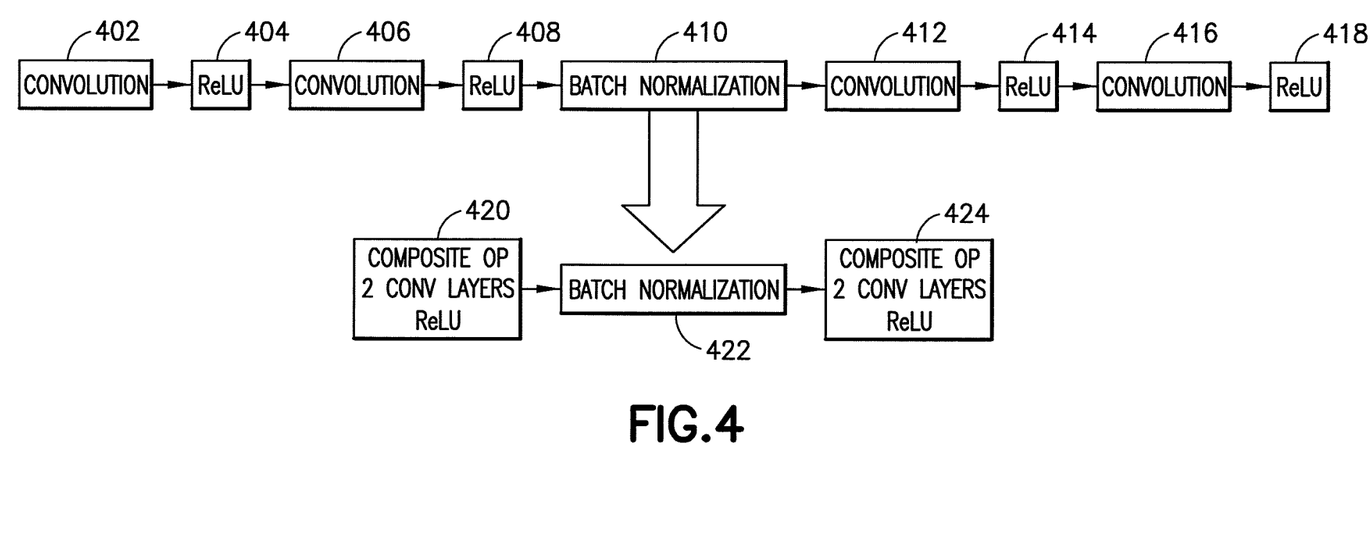
FIG. 4 is a diagram illustrating the flow of training a deep neural network.

Thus, during the training of the DNN, the second diagram 350 enables to perform forward and backward propagations in different composite operations. This separation between forward and backward propagations may be advantageous as the second diagram 350 design can be used for inference only (without requiring execution of the backward propagation). In addition, the flow of the second diagram 350 may work straightforwardly with techniques that require information about the whole batch (e.g. batch normalization) and that information occurs in a stage between the forward and backward propagation processes. This is indicated in FIG. 4 where the batch normalization can still be maintained separate or independent of the pipelining schemes used for the forward and backward propagations. This may also enable to have more freedom for the choice of the loss function, as it is not covered by the two pipelining schemes. Briefly, FIG. 4 depicts two schemes, the first with operations of convolution 402, a rectified linear unit 404, convolution 406, a rectified linear unit 408, batch normalization 410, convolution 412, a rectified linear unit 414, convolution 416, and a rectified linear unit 418 and the second with composite operation 420, batch normalization 422, and composite operation 424.

Returning to FIG. 3C, to further make use of parallel computations, the flow described by the third diagram may be used. The third diagram 360 is a computation graph that indicates the flow of the computation task in accordance with an example of the present subject matter. For enabling the flow of the third diagram 360 one pipelining scheme is defined for both forward and backward propagations and loss function calculations. In this case, the set of inputs 332 is provided in combination with both weights 331 and 336 as input to a composite operation 363 that can be invoked by a single routine for performing the forward propagation and backward propagation in accordance with a pipelining scheme that tries to parallelize as much operations as possible. Those operations to be parallelized involve matrix vector multiplication using crossbars and activation function using neurons and loss function computations. For example, while the second crossbar array is used to backpropagate an error signal, the first crossbar array may be used to compute matrix vector multiplication of the forward propagation. Additional memory may be required for holding the activations and error signals of the forward and backward propagation computations in this example.

Thus, during the training of the DNN, the third diagram 360 enables to perform forward and backward propagations in the same composite operation. This may be advantageous as it may need less memory consumption. For example, as soon as ΔW is computed, the pre-stored layer activations can be discarded and the memory can be reused for another sample in the batch. Another advantage may be that the execution flow of the third diagram may require less overhead. For example, at beginning and end of a composite operation there may always be an overhead period where not all arrays are used. By reducing the number of composite operations, this overhead may be reduced.

Figure 5:
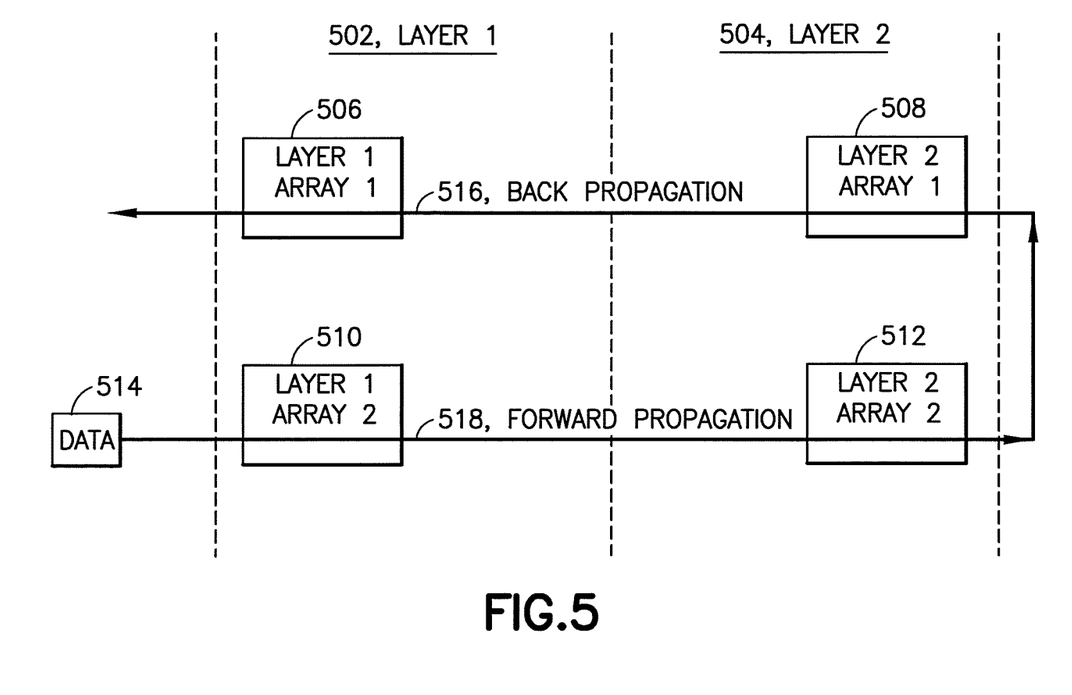
FIG. 5 illustrates an example structure of crossbar arrays for performing the training of a deep neural network.

Another advantage of the flow of the third diagram 360 may be that the flow may be combined with an array duplication technique as illustrated in FIG. 5. For example, the two crossbar arrays of the DNN may be duplicated (i.e. multiple crossbar arrays containing identical weights) such that one crossbar array is only used for the forward pass and the other only for the backward pass as indicated in FIG. 5. Layer 1 (item 502) and layer 2 (item 504) of FIG. 5 refer to the input layer 301 and hidden layer 303 of the DNN, respectively. The arrays Array1 and Array2 are crossbar arrays that perform matrix-vector multiplication that occurs between the input layer and the hidden layer and between the hidden layer and the output layer respectively. This may allow multiple operations to be executed at the same time on the same layer. Specifically, FIG. 5 shows data 514 input though Layer 1 Array 2 (item 510) then via forward propagation 518 through Layer 2 Array 2 (item 512); then from Layer 2 Array 2 to Layer 2 Array 1 (item 508); then from Layer 2 Array 1 (item 508) via back propagation 516 through Layer 1 Array 1 (item 506).

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A computer implemented method for executing a computation task composed of at least one set of operations, the method comprising:
   determining subsets of pipelineable operations of the set of operations in accordance with a pipelining scheme;
   creating a single routine for enabling execution of the determined subsets of operations by a hardware accelerator, the routine having as arguments a value indicative of input data and values of configuration parameters of the computation task, wherein a call of the routine causes a scheduling of the subsets of operations on the hardware accelerator in accordance with the values of the configuration parameters;
   upon receiving input data of the computation task, calling the routine, thereby causing the hardware accelerator to perform the computation task in accordance with the scheduling.

2. The method of claim 1, the computation task comprising any one of: training a deep neural network, performing inference using a trained neural network, matrix vector multiplication and matrix-matrix multiplication.

3. The method of claim 2, wherein the at least one set of operations comprises a first set of operations for forward propagation, a second set of operations for backward propagation and a third set of operations for both forward and backward propagation of the training; the method further comprising: generating for each of the first, second and third sets of operations a respective composite operation, wherein calling the routine comprises performing a single application programming interface (API) call for each composite operation of at least part of the generated composition operations.

4. The method of claim 2, the configuration parameters comprising parameters descriptive of the structure of the deep neural network and parameters required for configuring the training of the deep neural network.

5. The method of claim 1, further comprising providing an application programming interface, API, to the hardware accelerator, and creating the routine using the API, wherein the calling of the routine is a single API call.

6. The method of claim 1, further comprising providing a computation graph descriptive of the computation task, the computation task involving a deep neural network, determining the at least one set of operations by parsing the computation graph for identifying the at least one set of operations using nodes of the computation graph, generating a user graph such that each set of the at least one set of operations is represented by a node of the user graph, wherein calling the routine comprises identifying each node of the user graph that represents a respective set of operations, and for each identified node performing a single API call for the set of operation represented by the identified node.

7. The method of claim 1, further comprising receiving an output from the hardware accelerator indicative of the result of the computation task.

8. The method of claim 1, wherein the pipelining scheme is provided such that each of the subsets of operations comprises operations independent from each other that can be executed in parallel.

9. The method of claim 1, wherein the hardware accelerator operates in accordance with the pipelining scheme using memristor crossbar arrays, wherein the subsets of pipelineable operations are determined such that each subset of operations of the subsets may be performed in parallel on different crossbar arrays of the memristor crossbar arrays.

10. The method of claim 1, wherein the hardware accelerator operates in accordance with the pipelining scheme using memristor crossbar arrays, the computation task comprising training a deep neural network, wherein each layer of the deep neural network is associated with two crossbar arrays of the hardware accelerator, the two crossbar arrays comprising identical values, wherein causing the hardware accelerator to perform the computation task comprises: for each layer of the deep neural network using one crossbar array of the two crossbar array for forward propagation and the other crossbar array only for the backward propagation.

11. A computer program product comprising a computer-readable storage medium having computer-readable program code embodied therewith, the computer-readable program code configured for:
   determining subsets of pipelineable operations of at least one set of operations of a computation task in accordance with a pipelining scheme;
   creating a single routine for enabling execution of the determined subsets of operations by a hardware accelerator, the routine having as arguments a value indicative of input data and values of configuration parameters of the computation task, wherein a call of the routine causes a scheduling of the subsets of operations on the hardware accelerator in accordance with the values of the configuration parameters;
   upon receiving input data of the computation task calling the routine, thereby causing the hardware accelerator to perform the computation task in accordance with the scheduling.

12. The computer program product of claim 11, the computation task comprising one of: training a deep neural network, matrix vector multiplication and matrix-matrix multiplication.

13. The computer program product of claim 12, at least one set of operations comprises a first set of operations for forward propagation, a second set of operations for backward propagation and a third set of operations for both forward and backward propagation of the training, the method comprising: generating for each of the first, second and third sets of operations a respective composite operation, wherein calling the routine comprises performing a single application programming interface (API) call for each composite operation of at least part of the generated composition operations.

14. The computer program product of claim 12, the configuration parameters comprising parameters descriptive of the structure of the deep neural network and parameters required for configuring the training of the deep neural network.

15. The computer program product of claim 11, further configured for creating the routine using an API to the hardware accelerator.

16. The computer program product of claim 11, further configured for determining the at least one set of pipelineable operations by parsing a computation graph for identifying the at least one set of operations using nodes of the computation graph, generating a user graph such that each set of the at least one set of operations is represented by a node of the user graph, wherein calling the routine comprises identifying each node of the user graph that represents a respective set of operations, and for each identified node performing a single API call for the set of operation represented by the identified node.

17. The computer program product of claim 11, further configured for receiving an output from the hardware accelerator indicative of the result of the computation task.

18. The computer program product of claim 11, the pipelining scheme being provided such that each subset of the subsets comprises operations independent from each other that can be executed in parallel.

19. A computer system comprising:
at least one processor; and
at least one memory comprising computer-readable program instructions, wherein loading the computer-readable program instructions into the at least one processor and executing the computer-readable program instructions by the at least one processor causes the computer system to perform:
determining subsets of pipelineable operations of at least one set of operations of a computation task in accordance with a pipelining scheme;
creating a single routine for enabling execution of the determined subsets of operations by a hardware accelerator, the routine having as arguments a value indicative of input data and values of configuration parameters of the computation task, wherein a call of the routine causes a scheduling of the subsets of operations on the hardware accelerator in accordance with the values of the configuration parameters;
upon receiving input data of the computation task calling the routine, thereby causing the hardware accelerator to perform the computation task in accordance with the scheduling.

* * * * *